United States Patent
McBrian et al.

(10) Patent No.: US 8,682,865 B2
(45) Date of Patent: *Mar. 25, 2014

(54) LIVE-SERVER CONTENT STAGING

(75) Inventors: Charles A. McBrian, Belmont, CA (US); Darrick P. Brown, Redwood City, CA (US); Kenneth P. Sundermeyer, Belmont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/115,151

(22) Filed: May 25, 2011

(65) Prior Publication Data

US 2013/0238674 A1    Sep. 12, 2013

Related U.S. Application Data

(63) Continuation of application No. 10/688,062, filed on Oct. 17, 2003, now Pat. No. 8,005,925.

(51) Int. Cl.
*G06F 17/30* (2006.01)

(52) U.S. Cl.
USPC .......................................... 707/691; 707/827

(58) Field of Classification Search
USPC ........... 707/827, 218, 219, 691; 709/218, 219
See application file for complete search history.

(56) References Cited

U.S. PATENT DOCUMENTS

| | | | | |
|---|---|---|---|---|
| 6,044,398 | A * | 3/2000 | Marullo et al. | 709/219 |
| 6,151,599 | A * | 11/2000 | Shrader et al. | 1/1 |
| 6,185,701 | B1 * | 2/2001 | Marullo et al. | 714/38.14 |
| 6,301,664 | B1 * | 10/2001 | Di-Crescenzo et al. | 713/189 |
| 6,505,212 | B2 * | 1/2003 | Nakano et al. | 707/691 |
| 6,792,454 | B2 * | 9/2004 | Nakano et al. | 709/219 |
| 6,910,049 | B2 * | 6/2005 | Fenton et al. | 1/1 |
| 2003/0191938 | A1 * | 10/2003 | Woods et al. | 713/165 |

OTHER PUBLICATIONS

How to and Support FAQ, 2000, at http://r1020.servadmin.com/.
Nakano. Approaches to Content Management. Sep. 28, 2001. Addison-Wesley at http://www.awprofessional.com/articles/printerfriendly.asp? p=23469&rl=1.
U.S. Appl. No. 10/688,062, filed Oct. 17, 2003.
Office Action dated Jun. 19, 2007 in U.S. Appl. No. 10/688,062.
Office Action dated Feb. 25, 2008 in U.S. Appl. No. 10/688,062.
Advisory Action dated Apr. 11, 2008 in U.S. Appl. No. 10/688,062.
Examiner's Answer to Appeal Brief dated Oct. 31, 2008 in U.S. Appl. No. 10/688,062.
BPAI Decision dated Dec. 22, 2010 in U.S. Appl. No. 10/688,062.
Examiner Interview Summary dated Feb. 18, 2011 in U.S. Appl. No. 10/688,062.
Notice of Allowance dated Feb. 18, 2011 in U.S. Appl. No. 10/688,062.

* cited by examiner

*Primary Examiner* — Robert Beausoliel, Jr.
*Assistant Examiner* — Noosha Arjomandi
(74) *Attorney, Agent, or Firm* — Kilpatrick Townsend & Stockton LLP

(57) ABSTRACT

A process for staging file assets on a live Web server is described that includes detecting an index page of the Web server, creating a staging folder on the Web server, wherein the staging folder does not default to a directory listing when accessed, inserting a randomized string into a name of file assets containing content to be staged, and storing the file assets in the staging folder. By creating the staging folder that does not default to a directory listing when accessed, a system is enabled where users may access the file assets while other users may not.

11 Claims, 2 Drawing Sheets

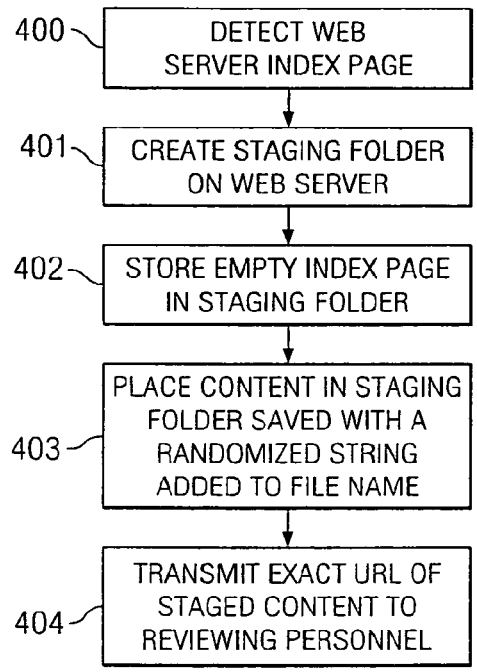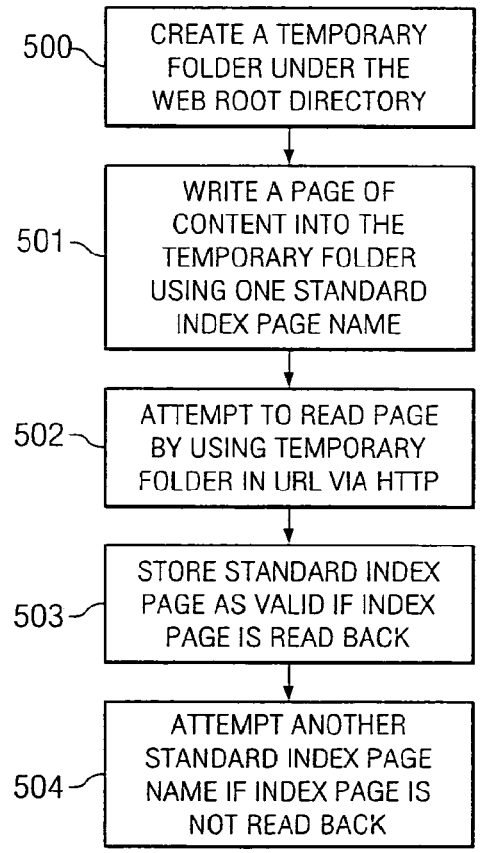

LIVE-SERVER CONTENT STAGING

CROSS-REFERENCE TO RELATED APPLICATION

This application is a continuation application of U.S. Ser. No. 10/688,062 filed on Oct. 17,2003, allowed, the contents of which are incorporated herein by reference.

TECHNICAL FIELD

The present invention relates, in general, to content development systems and, more specifically, to live-server content staging.

BACKGROUND OF THE INVENTION

Companies that sponsor Web sites typically have one or more live Web servers from which the Web site is served to visiting Web browsers. When changes or additions to these Web sites are developed, the new material is usually deployed first on one or more staging Web servers where the material can be reviewed and approved by authorized personnel. Companies generally consider the content developed for their Web sites to be confidential information to be protected against public disclosure until it is ready to "go live." For this reason, the staging Web servers are usually separate and independent from the live Web servers and are typically located behind the company's firewall to restrict access to the material. Usually, only authorized individuals will have access to the staged content on the staging Web servers in order to review and approve the staged content. Once approved, another party or develop or may then transfers the approved material from the staging Web server to the live Web server.

While this method provides a systematic approach to developing and testing Web content in a relatively safe environment, small or medium-sized companies may not have the resources to have a second, totally separate Web server for staging content. Moreover, some of these small or medium-sized companies may have third-party Web hosts hosting their Web content. In third-party hosting situations, the companies may not even have the ability to physically access the Web server itself, let alone, its own content on the Web server. While the companies would be able to access their Web content by browsing to the Web server over the Internet, this type of access does not generally allow for any modifications to the underlying Web files. These small to medium-sized companies are, therefore, left with the choice to either review material in static Web development environments or hire third-party developers to completely develop and stage the new material.

BRIEF SUMMARY OF THE INVENTION

The present invention is directed to a process for staging file assets, such as Web page changes, new Web content, movie files, images, documents, or the like on a live Web server. Developers usually create new Web content or effects changes to Web pages using a Web development environment. Those changes are then saved to specific Web files. As the developer completes the development stage, he or she may then make the Web files available for product managers or other reviewing authorities to review and approve the new Web content before allowing those changes or additions to be made available to the public.

A development environment configured according to one embodiment of the present invention includes functionality to scan the live Web server for its active index page related to a specific Web site. In one embodiment, the development environment attempts to write a test document to the Web server using a selection of standard index page addresses. After each attempted write, the development environment tries to read back the test document by requesting it from the live Web server. If the address was correct, and the test document is, in fact, received from the live Web server, the development environment marks that particular index address as a valid address for the live Web server. If, however, the address was incorrect, and the development environment does not detect the test document or, instead, receives a directory listing or error message, another standard index address is retrieved to begin the write/read process over again. At some point in the process, the development environment will obtain the appropriate address for the index file either automatically through the multiple write/read attempts of the standard index addresses, or, by simply asking the user if none of the stored, standard index page addresses work.

Once the index file is located, the developer uses the development environment to create a staging or review folder to hold the new pending Web files. A blank index file is then created and stored in the new staging folder. The blank index file is generally stored using the same name as the index file for the Web server. By saving a blank index file, an unauthorized user will not be able to obtain a directory listing of the staging folder. An unauthorized user attempting (either intentionally or unintentionally) to access the index file of the staging folder will only see the blank index file.

As the developer begins storing the new Web files or other file assets into the staging folder, he or she adds a randomized string to the name of the file. The randomized string operates to prevent an unauthorized party from inadvertently accessing the staged Web files or other file assets without first knowing what the entire name of the file is, including the randomized string. Authorized users may also be prevented from accessing the staged Web files or other file assets if they do not know the exact uniform resource locator (URL) of the staged Web files or other file assets. Therefore, the developer communicates these URLs to the parties that are involved in reviewing the new Web content.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 is a flowchart illustrating example steps of the staging process encountered in practicing one embodiment of the present invention; and FIG. 5 is a flowchart illustrating example steps of the process for determining a Web server's index page.

DETAILED DESCRIPTION OF THE INVENTION

Figure 1:
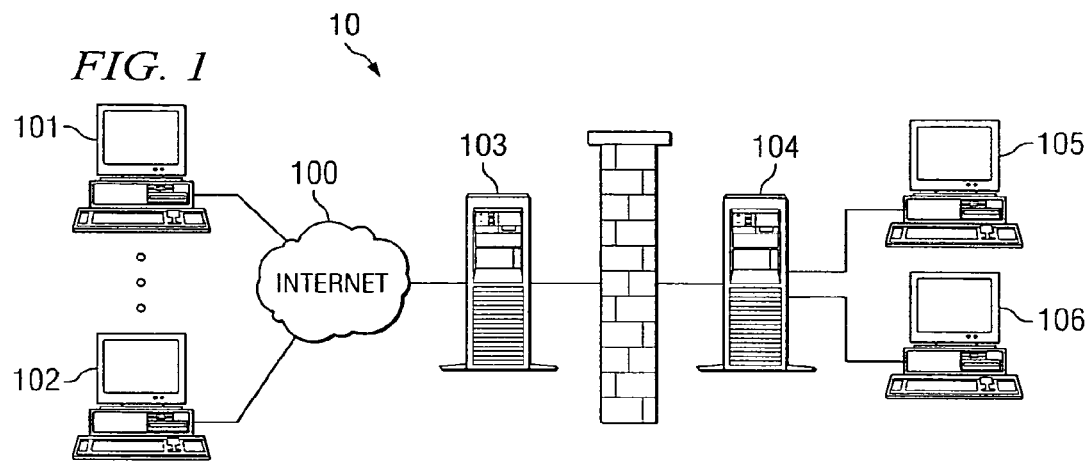
FIG. 1 is a block diagram illustrating an Internet communication system.

In order to properly consider the teachings of the present invention, it may be useful to review an example of an existing system architecture. FIG. 1 is a block diagram illustrating Internet communication system 10. In accessing Internet 100, users 101 and 102 access Web content and Web pages through live Web server 103, which may be comprised of one or more actual servers. Behind firewall 11, staging Web server 104 may contain new and developing Web content that is intended to be deployed on live Web server 103 at some point in the future. The new content may, for instance, have been stored on staging Web server 104 by developer 105. Content manager 106 may then access the stored Web content to review the new material for approval. Once approved, the new content may then be transferred to live Web server 103 for presentation to accessing public users, such as users 101 and 102.

Figure 2:
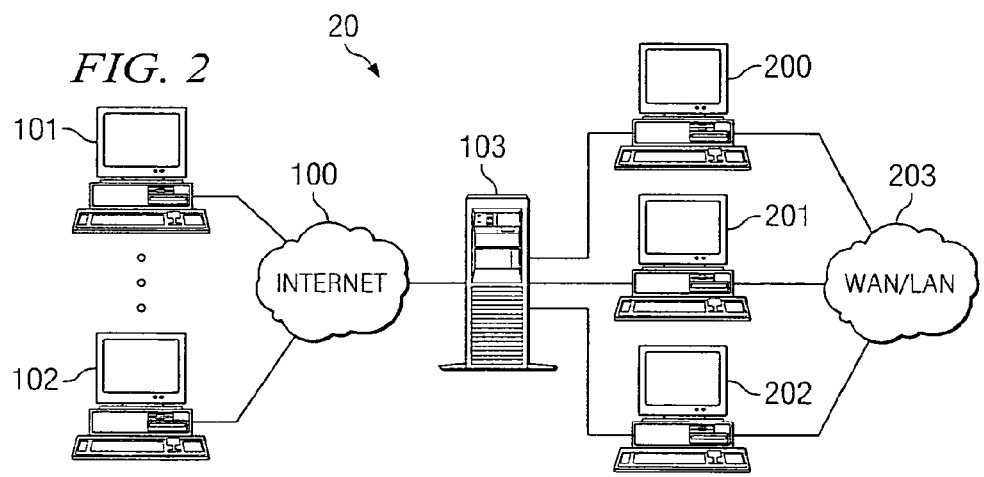
FIG. 2 is a block diagram illustrating a Web development system configured according to one embodiment of the present invention.

FIG. 2 is a block diagram illustrating Web development system 20 configured according to one embodiment of the present invention. Instead of employing a live Web server and a staging Web server, Web development system 20 uses only live Web server 103. In order to prevent unauthorized access to the updated Web content, a developer, such as Web developer 200, creates a staging folder on live Web server 103 and stores a blank index file therein. The blank index file may be named in the same manner as the index file to the main Web site. Web developer 200 stores updated Web content in the staging folder using a randomized string within the file name. Because the staging folder contains a blank index file, an unauthorized user may not easily obtain access to or information about the contents of the staging folder because the blank index file prevents it from defaulting to a directory listing when accessed or attempted to be accessed incorrectly. After the staged Web content has been completed, Web developer 200 sends the exact path location or URL of the staged Web files to any one or more of content managers 201 and 202 using the network wide area network (WAN) or local area network (LAN), after which content managers 201 and 202 may then directly access the files for review. Because the staging folder does not default to provide a director listing, public users, such as users 101 and 102 will not be able to access the staging file or its contents over Internet 100.

Figure 3A:
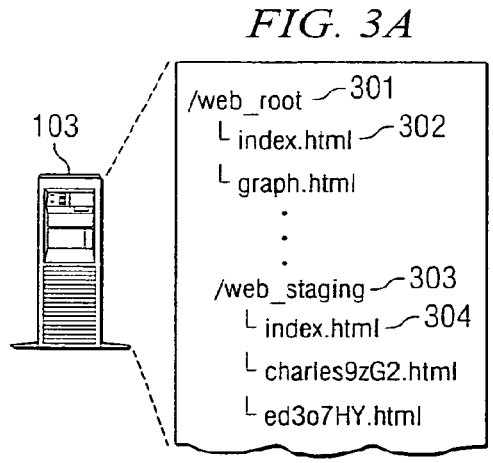
FIG. 3A is a block diagram illustrating one embodiment of a Web directory on a live Web server, wherein the Web directory is configured according to the teachings of the present invention.

FIG. 3A is a block diagram illustrating one embodiment of Web directory 300 configured according to the teachings of the present invention resident on live Web server 103. Web directory 300 contains the live Web application at web_root directory 301. The Hypertext Markup Language (HTML) Web files are stored within web_root directory 301. Live index file 302, index.html, may either have a list of the files accessible through the Web application or may be the home page for the particular Web site. Staging folder 303, web_staging, has been created on live Web server 103 within web_root directory 301 to include index file 304, index.html, as a blank file. By storing a blank file as index file 304, staging folder 303 does not default to a directory listing should an outside user either request such an index file or enter a URL which does not correctly address a file within staging folder 303.

In the development process, the Web developer stores development files onto staging folder 303. The names of the staged Web content files stored include a randomized string that makes it very difficult for an external user to guess at or try to find. Depending on the level of security that is desired, the randomized string may include many different numbers and types of characters. For example, very good security may be implemented by using a 6-8 character random string of digits and letters. The 10 possible digits and 26 possible letters results in 36 elements that may be selected per character. This example 6-8 character random string would, therefore, yield between $6^{36}$ and $8^{36}$ possible 6-8 character combinations. Attempting to break this "code" would typically require a significant amount of sophistication, a significant amount of time, and a significant amount of processing power. Thus, depending on the sensitivity of the application, the Web developers may select the specific available characters and size of the random string to achieve the appropriate level of security. The developer would then email or otherwise communicate the specific file name, including the randomized string, stored on live Web server 103 within staging folder 300 for the content manager to review.

Figure 3B:
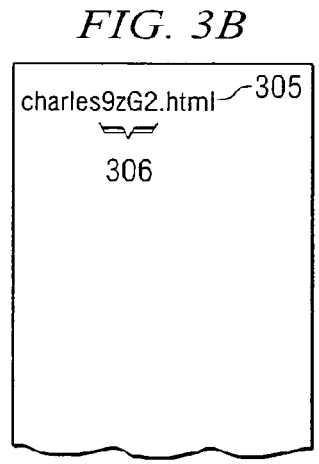
FIG. 3B is an illustration of a staging file name configured according to one embodiment of the present invention.

FIG. 3B is an illustration of staging file name 305 configured according to the present invention. The base file name would comprise "charles" as the filename and "html" as the file extension indicating that the "charles" file is an HTML file type. Randomized string 306, "9zG2," is added to the base file name by the developer to "secure" the staged Web file on live Web server 103. Random string 306 includes digits (10 possible choices), lower-case letters (26 possible choices), and upper-case letters (26 possible choices). Thus, there would be 62 possible element selections over a 4-character random string yielding $4^{62}$ possible element/character combinations.

FIG. 4 is a flowchart illustrating example steps of staging process 40 encountered in practicing one embodiment of the present invention. In step 400, the index page of the live Web server is detected. Once discovered, a staging folder is created on the live Web server in step 401. A blank index file is stored within the staging folder in step 402. In step 403, the Web designer places content files within the staging folder using a randomized string added to the stored file name. In step 404, the Web designer transmits the exact URLs, including the randomized string, to the personnel responsible for reviewing and authorizing the new Web content. By using the exact URL of the stored, staged Web content, the reviewing personnel may directly access the files stored on the live Web server. Without previous knowledge of the exact URL, it would be extremely difficult for some person to gain access to those staged content files.

In practice, it may be somewhat difficult to determine the index page to any given Web server. FIG. 5 is a flowchart illustrating example steps of process 50 for determining a Web server's index page. As the user attempts to start the staging process, the content development environment begins by creating a temporary folder under the web root directory, in step 500. Using a sample standard index page address retrieved from a database of standard addresses accessible by the development environment, a page of content is written to the temporary folder in step 501. In step 502, after each write, the development environment attempts to read the page via hypertext transfer protocol (HTTP) that was written in step 501 by using the URL of the temporary folder. If the index page is read back according to the written page, the standard index address is validated in step 503. If, however, the standard index address used was not correct, and the attempted read results in failure, the development environment accesses the standard address database and changes the location to which the file will be addressed, in step 504.

It should be noted that while many of the embodiments described herein used Web files as examples of information that may be readily suitable for the present staging process, other documents and file assets may be staged onto live servers in such a way to restrict access to those assets to a defined group. The description of the embodiments herein, is not intended to limit the present invention to just staging Web files.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for staging file assets on a live server comprising:
    detecting an index page of said live server by:
        writing a page of content to a temporary folder of a root directory of said live server according to one of a plurality of standard addresses,
        attempting to access said temporary folder from said live server,
        writing said page of content to said temporary folder using another of said plurality of standard addresses when said file cannot be read, and
        validating said another of said plurality of standard addresses when said index page is read back;
    creating a staging folder within a file system of said live server, wherein said staging folder does not default to a directory listing of said file system when accessed; and
    storing said file assets in said staging folder.

2. The method of claim 1 further comprising:
    communicating a name of said file assets to be staged to a reviewing party.

3. The method of claim 1 wherein said plurality of standard addresses is stored on a memory accessible by a development environment.

4. The method of claim 1 wherein said creating step further comprises:
    generating a blank index file named according to said detected index file; and
    storing said blank index file in said staging folder, wherein said blank index file inhibits default directory listing of said staging folder in said file system.

5. A computer program product having a non-transitory computer readable medium with computer program logic recorded thereon for facilitating staging file assets, wherein said computer program logic comprises code that when executed by a computer causes the computer to perform a method comprising:
    detecting, in a file system of a Web server, an index of said Web server by writing a test file to a temporary folder of a root directory using one of a plurality of standard index locations, requesting access to said test file from said Web server, writing said test file to said temporary folder using another of said plurality of standard index locations when said test file cannot be accessed, and certifying said another of said plurality of standard index locations when said test file is accessed;
    generating, in said file system of said Web server, a staging folder;
    storing, in said staging folder, said file assets to be staged, wherein said file assets are served by said Web server to users accessing said staging folder; and
    inhibiting listing of said staging folder in a default directory listing of said file system by said Web server.

6. The computer program product of claim 5 wherein said plurality of standard addresses is stored on a memory accessible by a development environment.

7. The computer program product of claim 5 wherein said generating further comprises:
    creating an empty index named according to said detected index; and
    storing said empty index in said staging folder, wherein said empty index inhibits said listing of said staging folder in said default directory listing of said file system by said Web server.

8. A method for reviewing proposed file content on a live Web server comprising:
    scanning said live Web server for an index file by retrieving a first index address from a plurality of standard index addresses, writing a test document to a temporary folder of a web root of said live Web server using said first index address, requesting said test document from said live Web server, and marking said first index address valid when said test document is retrieved;
    opening a review folder in a file system of said live Web server;
    creating a blank index on said review folder, wherein said blank index is named according to a name of said index file, wherein said blank index inhibits listing by said Web server of said review folder in a default directory listing of said file system; and
    storing said proposed file content in said review folder, wherein a file name represents said proposed file content, and wherein said proposed file content is served by said Web server to users accessing said file name.

9. The method of claim 8 further comprising:
sharing the file name with a reviewer.

10. The method of claim 8 further comprising:
    retrieving a next index address from said plurality of standard index addresses when said test document is not retrieved during said requesting step;
    writing said test document to said temporary folder using said next index address; requesting said next test document from said live Web server;
    marking said next index address valid when said test document is retrieved during said requesting said next index step; and repeating from said retrieving said next index step when said next test document is not retrieved during said requesting said next index step.

11. The method of claim 8 wherein said staging folder is not discoverable through a default directory listing of said file system by said server.

\* \* \* \* \*